(No Model.) 2 Sheets—Sheet 1.

H. ABBOTT.
ORNAMENTING GLAZED OR ENAMELED SURFACES.

No. 309,912. Patented Dec. 30, 1884.

Witnesses:
Jas. E. Hutchinson
Henry C. Hazard

Inventor:
Henry Abbott, by
Crindle and Russell, his attys (No Model.) 2 Sheets—Sheet 2.

H. ABBOTT.
ORNAMENTING GLAZED OR ENAMELED SURFACES.

No. 309,912. Patented Dec. 30, 1884.

Witnesses:
Jas. E. Hutchinson
Henry C. Hazard

Inventor:
Henry Abbott, by
Crindle & Russell, his Attys

United States Patent Office.

HENRY ABBOTT, OF NEWARK, NEW JERSEY, ASSIGNOR OF THREE-FOURTHS TO THE ELGIN NATIONAL WATCH COMPANY, OF CHICAGO, ILLINOIS, AND WINTON C. GARRISON, OF NEWARK, NEW JERSEY.

ORNAMENTING GLAZED OR ENAMELED SURFACES.

SPECIFICATION forming part of Letters Patent No. 309,912, dated December 30, 1884.

Application filed January 12, 1884. (No model.)

*To all whom it may concern:*

Be it known that I, HENRY ABBOTT, of Newark, in the county of Essex, and in the State of New Jersey, have invented certain new and useful Improvements in Ornamenting of Glazed or Enameled Surfaces; and I do hereby declare that the following is a full, clear, and exact description thereof, reference being had to the accompanying drawings, making a part of this specification, in which—

Figure 1:
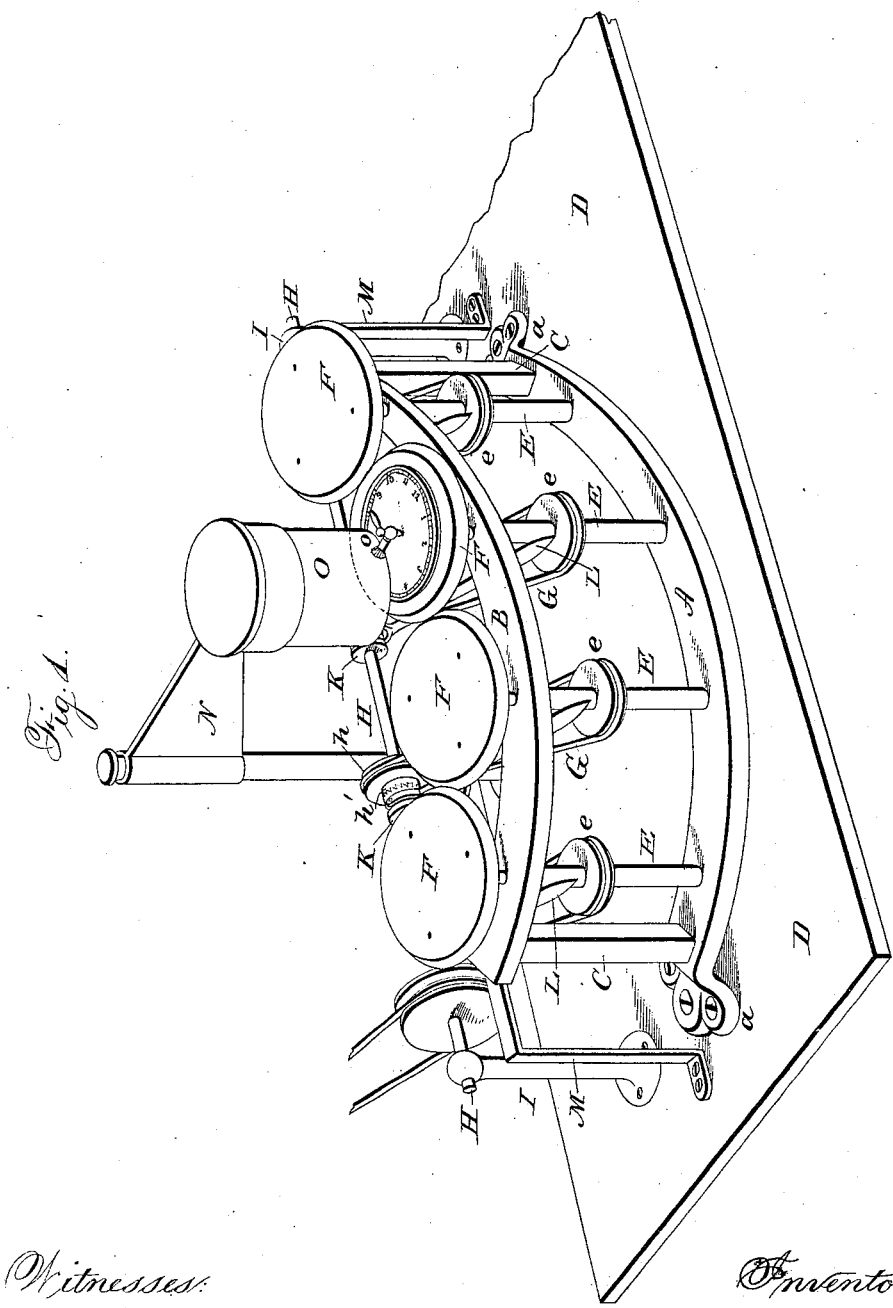
Figure 2:
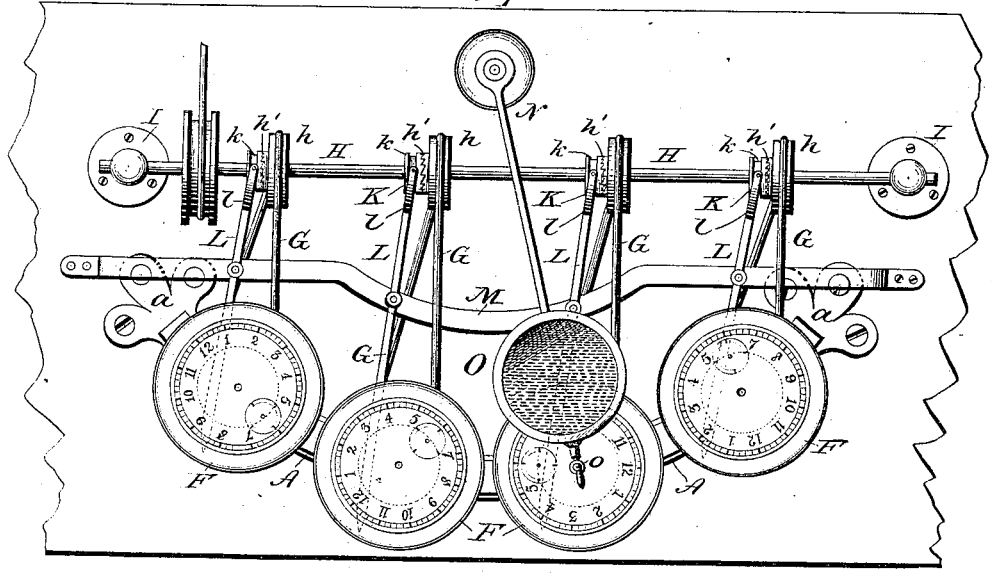
Figure 3:
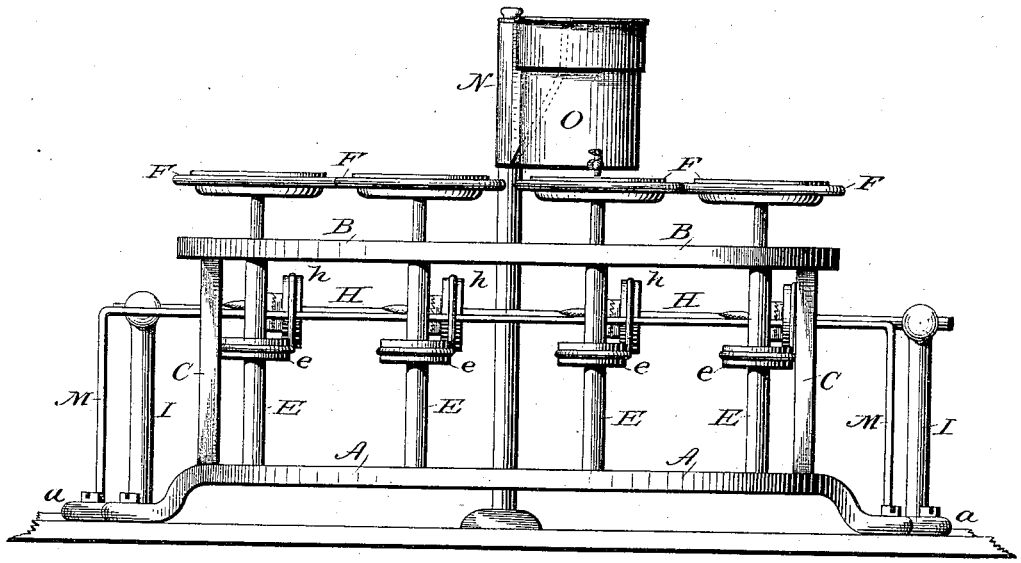

Figure 1 is a perspective view of my apparatus as arranged for use. Fig. 2 is a plan view of the upper side of the same. Fig. 3 is a front elevation of said apparatus.

Letters of like name and kind refer to like parts in each of the figures.

My invention relates to the ornamentation of enameled or glazed surfaces by means of transfer-films, and has for its object the rapid and ready production of films having uniform thickness; to which end said invention consists, principally, as a means for producing transfer-films, in a series of horizontal independently-rotatable disks, each adapted to receive and support a suitably-prepared plate, in combination with a centrally-located reservoir or tank, which is adapted to contain a film-producing liquid and to discharge a portion of the same upon the plate of either disk, substantially as and for the purpose hereinafter specified.

It consists, further, as a means for producing transfer-films, in a series of horizontally-rotatable disks, each adapted to receive and support a suitably-prepared plate, in combination with a reservoir or tank for containing a film-producing liquid, which reservoir is adapted to be turned to and discharge its contents upon either of said plates, substantially as and for the purpose hereinafter shown.

It consists, further, as a means for producing transfer-films, in a series of horizontally-rotatable disks, each adapted to receive and support a suitably-prepared plate, and the whole arranged upon a circular line, in combination with a reservoir, which is supported upon or at the center of such circle, and is adapted to be swung upon or around such center, so as to cause its discharge to be directly over either of said disks, substantially as and for the purpose hereinafter set forth.

It consists, finally, as a means for producing transfer-films, in a series of horizontal independently-rotatable disks, each adapted to receive and support a suitably-prepared plate, and the whole arranged upon a circular line, in combination with a liquid-reservoir, which is supported upon or at the center of said circle, and is capable of being swung upon or around such center, so as to bring its discharge directly over either of said disks, substantially as and for the purpose hereinafter shown and described.

In the annexed drawings, A and B represent two metal bars which are arranged in horizontal parallel lines, and are connected together and secured in relative positions by means of two or more vertical posts, C. Said bars are formed horizontally upon the line of a circle, and are supported and secured to a bench, D, or other like article, by means of feet $a$, which extend downward at suitable points from said lower bar, A.

Journaled vertically within the bars A and B are a number of spindles, E, each of which extends above said bar B, and has attached to its upper end a flat disk, F, that has any desired horizontal dimensions, and is adapted to be rotated in a horizontal plane with its said spindle. Each of the spindles E is provided with a grooved pulley, $e$, around which passes a belt, G, that from thence extends rearward to and around a similar pulley, $h$, which is journaled upon and may be caused to revolve with a horizontal shaft, H. Said shaft is supported in suitable bearings, I, and may be caused to rotate by any usual means. Each pulley $h$ is provided upon one side of its hub with a clutch-face, $h'$, with which may be engaged a clutch, K, that is adapted to slide lengthwise of the shaft H, while so connected therewith as to cause it to revolve with said shaft. Said clutch is moved into or out of engagement with its said pulley by means of a lever, L, which is pivoted upon a suitable support, M, at or near its longitudinal center, with its inner forked end, *l*, in engagement with a groove, *k*, in the periphery of said clutch, and its outer end projecting from beneath the frame-bar B in proximity to the spindle E, with which said pulley is connected. As arranged, by moving the outer end of each lever L in one direction its clutch K will be caused to engage with its pulley *h*, and the latter, together with the spindle and disk with which they are connected, will be caused to rotate, while by an opposite movement of said lever said clutch and pulley will be disengaged and the motion of the latter and its connecting parts will cease.

Pivoted at the center of the circle upon which the frame-bars A and B are formed is a bracket-arm, N, which at its outer end is adapted to receive and sustain a reservoir or tank, O. Said reservoir is intended to contain a film-producing liquid, and is provided with a spigot, *o*, through which the same may be discharged. The length of said arm N is such that said spigot may be swung directly over the center of either disk F and the required portion of said liquid discharged upon said disk at such point.

In the use of my apparatus an engraved or etched plate, P, having its lines filled with colored material, is placed upon each disk F, and a sufficient quantity of liquid collodion, gelatine, or other film-producing substance, is flowed upon the surface of said plate, after which the same is caused to revolve until, by centrifugal force, said liquid is evenly distributed and has sufficiently hardened, when the motion is arrested, said plate removed, and another plate placed in position for treatment.

The number of rotatable disks is governed by the time required for the distribution and hardening of the film-producing liquid, and there should be a sufficient number, so that by the time the operator has placed plates upon each of the disks the plate first placed in position will be ready for removal, by which means no time will be lost and the coating operation will be practically without interruption.

Having thus fully set forth the nature and merits of my invention, what I claim as new is—

1. As a means for producing transfer-films, a series of horizontal independently-rotatable disks, each adapted to receive and support a suitably-prepared plate, in combination with a centrally-located reservoir or tank, which is adapted to contain a film-producing liquid and to discharge a portion of the same upon the plate of either disk, substantially as and for the purpose specified.

2. As a means for producing transfer-films, a series of horizontally-rotatable disks, each adapted to receive and support a suitably-prepared plate, in combination with a reservoir or tank for containing a film-producing liquid, which reservoir is adapted to be turned to and discharge its contents upon either of said plates, substantially as and for the purpose shown.

3. As a means for producing transfer-films, a series of horizontally-rotatable disks, each adapted to receive and support a suitably-prepared plate, and the whole arranged upon a circular line, in combination with a reservoir, which is supported upon or at the center of such circle, and is adapted to be swung upon or around such center, so as to cause its discharge to be directly over either of said disks, substantially as and for the purpose set forth.

4. As a means for producing transfer-films, a series of horizontal independently-rotatable disks, each adapted to receive and support a suitably-prepared plate, and the whole arranged upon a circular line, in combination with a liquid-reservoir, which is supported upon or at the center of said circle, and is capable of being swung upon or around such center, so as to bring its discharge directly over either of said disks, substantially as and for the purpose shown and described.

In testimony that I claim the foregoing I have hereunto set my hand this 28th day of December, 1883.

HENRY ABBOTT.

Witnesses:
CHARLES Z. PEYN,
S. C. SCOTT.